US012724929B2

(12) United States Patent
Lecroart

(10) Patent No.: US 12,724,929 B2
(45) Date of Patent: Sep. 1, 2026

(54) METHOD AND DEVICE FOR GENERATING A RECOMMENDATION FOR CORRECTING A CONFIGURATION FILE IN A COMPUTING ENVIRONMENT

(71) Applicant: ATOS FRANCE, Bezons (FR)

(72) Inventor: Yannick Lecroart, La Grande Motte (FR)

(73) Assignee: ATOS FRANCE, Bezons (FR)

( * ) Notice: Subject to any disclaimer, the term of this patent is extended or adjusted under 35 U.S.C. 154(b) by 56 days.

(21) Appl. No.: 18/904,804

(22) Filed: Oct. 2, 2024

(65) Prior Publication Data

US 2025/0111095 A1 Apr. 3, 2025

(30) Foreign Application Priority Data

Oct. 2, 2023 (EP) .................................... 23306683

(51) Int. Cl.
*G06F 21/64* (2013.01)
*G06F 9/445* (2018.01)
(Continued)

(52) U.S. Cl.
CPC .......... *G06F 21/64* (2013.01); *G06F 9/44505* (2013.01); *G06F 8/71* (2013.01); (Continued)

(58) Field of Classification Search
USPC ............................................................. 726/1
See application file for complete search history.

(56) References Cited

U.S. PATENT DOCUMENTS 11,258,807 B2 * 2/2022 Muddu ............... H04L 63/1408
12,530,173 B1 * 1/2026 Buliani ..................... G06F 8/34
(Continued)

FOREIGN PATENT DOCUMENTS

CN 104699741 A * 6/2015 ............ G06F 16/14

OTHER PUBLICATIONS

European Search Report and Written Opinion issued in EP23306683 issued on Feb. 16, 2024.
(Continued)

*Primary Examiner* — Sakinah White-Taylor
(74) *Attorney, Agent, or Firm* — ARC IP Law, PC; Joseph J. Mayo

(57) ABSTRACT

The invention relates to a method and device for generating a recommendation for correcting a configuration file of an item of infrastructure of a computing environment within which services run. The infrastructure is deployed automatically from said configuration file. The method includes obtaining a runtime report that includes a compliance anomaly detected in the configuration file while said service is being run, and presenting an anomaly correction request as input to a previously trained generative artificial intelligence model. The correction request includes a question formulated in natural language and anomaly context information that includes at least the runtime report. The method also includes obtaining as output a configuration file correction recommendation, validating the recommendation for correcting the configuration file, determining a similarity measurement with respect to the context information, comparing with an acceptability threshold, and when the similarity measurement is validated, submitting the configuration file correction recommendation for user evaluation.

15 Claims, 6 Drawing Sheets

(51) Int. Cl.

| | |
|---|---|
| ***G06N 3/0475*** | (2023.01) |
| ***G06N 3/092*** | (2023.01) |
| ***G06N 20/00*** | (2019.01) |
| *G06F 8/71* | (2018.01) |

(52) U.S. Cl.
CPC ........... *G06N 3/0475* (2023.01); *G06N 3/092* (2023.01); *G06N 20/00* (2019.01)

(56) References Cited

U.S. PATENT DOCUMENTS

| | | | | |
|---|---|---|---|---|
| 2017/0242663 | A1* | 8/2017 | Abu Hassan | G06F 8/10 |
| 2018/0101464 | A1* | 4/2018 | Fan | G06F 11/3604 |
| 2021/0141900 | A1* | 5/2021 | Brown | G06F 21/57 |
| 2022/0156121 | A1 | 5/2022 | Parthasarathy et al. | |
| 2023/0022222 | A1 | 1/2023 | Files et al. | |
| 2023/0208869 | A1* | 6/2023 | Bisht | G06N 7/01 726/23 |
| 2023/0385085 | A1* | 11/2023 | Singh | G06F 9/451 |
| 2024/0095463 | A1* | 3/2024 | Leary | G06F 40/30 |
| 2024/0333746 | A1* | 10/2024 | Williams | G06F 11/3624 |
| 2024/0420418 | A1* | 12/2024 | Wu | G06F 40/30 |

OTHER PUBLICATIONS

Kassel, Raphael; https://datascientest-com.translate.goog/g-learning-tout-savoir?_x _tr _sl=auto& _x _tr _tl=en& _x _tr _hl=en& _x _tr _pto=wapp Mar. 29, 2021 (English Translation).

* cited by examiner

METHOD AND DEVICE FOR GENERATING A RECOMMENDATION FOR CORRECTING A CONFIGURATION FILE IN A COMPUTING ENVIRONMENT

This application claims priority to European Patent Application Number 23306683.6, filed 2 Oct. 2023, the specification of which is hereby incorporated herein by reference.

BACKGROUND OF THE INVENTION

Field of the Invention

The at least one embodiment of the invention relates to the technical field of managing infrastructure in a computing environment, in particular infrastructure deployed automatically by a computer program.

In particular, it applies to correcting the provisioning configuration of such infrastructure.

Description of the Related Art

Infrastructure-as-Code (IaC) consists in managing and provisioning infrastructure using lines of computer program code, rather than manual processes.

IaC involves the creation of configuration files, or scripts, which contain the characteristics of the infrastructure, making it easier to modify and distribute configurations. IaC also ensures that the same environment is provided each time the configuration computer program is used. By codifying and documenting configuration characteristics, IaC facilitates configuration management, and in particular helps avoid undocumented ad hoc configuration changes.

Version control is an important part of IaC; configuration files must be managed by a source control system just like any other software source code file. IaC deployment also enables the infrastructure to be broken down into modules, which can then be combined in a variety of automated ways.

Infrastructure-as-Code thus can address issues such as efficient infrastructure management, deployment automation, versioning management, scalability, upgradability, consistency, and compliance. It increases operational efficiency, reduces human error and facilitates collaboration between infrastructure management teams.

However, due to human error, the scripts used to provision environments or deploy applications and services may contain vulnerabilities, security flaws or non-compliance with internal or industry best practices. For this reason, security testing tools such as SAST (Static Application Security Testing) and DAST (Dynamic Application Security Testing) can be used to detect common flaws in application source code before a release is compiled, or to examine configuration problems in an application/service running in an active environment.

While these two tools, SAST and DAST, are regularly used in tandem to extract and highlight security anomalies, it remains the responsibility of software developers/architects to apply the recommendations/modifications proposed by these tools, by manually modifying the configuration file/script affected by the security flaw.

This work can be long and tedious, depending on the size of the project and the number of services deployed and in operation. It can also quickly prove time-consuming and repetitive when scaling is an imperative.

Furthermore, SAST and DAST tools are numerous and not standardized, so they do not describe security flaws or configuration problems in the same way. As a result, when a company chooses to replace one tool with another, in-house developer/architect teams have to adapt to each set of terminology when implementing patches in IaC scripts.

Even when a company chooses to use a single tool and maintain it over time, updates to this tool, for example to adapt to new threats or security standards (by adding new rules or parameters to the knowledge database), still have to be carried out manually.

Thus, there is a need to automate Infrastructure-as-Code once security and compliance analyses have been carried out on source code and applications in operation. It is also essential to be able to automate the adaptation to updates or replacements of SAST and DAST test tools.

BRIEF SUMMARY OF THE INVENTION

One or more embodiments of the invention improves the situation.

According to at least one embodiment, a method is proposed for generating a recommendation for correcting a configuration file of an item of infrastructure of a computing environment within which services run, said infrastructure having been deployed automatically from said configuration file, said method comprising:

- obtaining and storing in memory a runtime report comprising a compliance anomaly detected in the configuration file while said service is being run;
- presenting an anomaly correction request as input to a previously trained generative artificial intelligence model, said correction request comprising a question formulated in natural language and anomaly context information comprising at least the runtime report, and obtaining as output a configuration file correction recommendation;
- validating the recommendation for correcting the configuration file, comprising the determining of a similarity measurement with respect to said context information and comparing with an acceptability threshold;
- when the similarity measurement is above the acceptability threshold, submitting the configuration file correction recommendation for user evaluation.

At least one embodiment of the invention thus proposes a completely new and inventive approach to managing a computing environment whose infrastructure has been deployed using program code instructions, according to an Infrastructure-as-Code (IaC) technique. It is based on a generative artificial intelligence module whose predictive model, of the Large Language Model type, has been trained to perform conversational agent tasks, and proposes a solution for querying this model so as to automatically obtain a recommendation for correcting the faulty configuration file.

According to one or more embodiments, this method may comprise other features, taken alone or in combination, which are presented below.

According to one or more embodiments, the method comprises extracting attributes from the runtime report, said attributes comprising at least one anomaly type and a configuration file type, generating a request to obtain said question from a pre-constructed standard question and said attributes, presenting said request as input to said artificial intelligence module during a first interaction with the artificial intelligence module, and obtaining said question as output from the module.

A first interaction with the generative artificial intelligence model thus results in the correction request question (corresponding to a second interaction).

According to one or more embodiments, this first interaction is based on a standard, pre-constructed question that is completed by inserting said at least one extracted attribute and context information.

One advantage of having the generative AI construct the question is to increase the chances that it will be comprehensible to it and lead to a satisfactory answer.

According to one or more embodiments, the method comprises extracting keywords from said attributes of the runtime report and obtaining additional context information by querying at least one data table, comprising entries associating context information of the computing environment with at least one said keyword.

One advantage is to obtain context information specific to the detected anomaly for the computing environment in operation.

According to one or more embodiments, the additional context information belongs to a group comprising at least:

the configuration file that generated the anomaly, information on a security policy applicable to the computing environment, one or more examples of previously obtained correction requests/recommendations.

According to at least one exemplary embodiment, a said data table, called a knowledge database, is a vector database, associating with one or more items of metadata one or more vectors representative of a document describing a security policy applicable to the computing environment. This encoding of context information allows the stored information to be compressed. One advantage is that context elements comprising larger documents can be presented to the generative AI module without exceeding the request size limits set for the generative AI module.

According to at least one embodiment, a said data table is a data table associated with a type of anomaly, for example a Q table comprising one or more examples of previously obtained correction requests/recommendations, a said example being associated with a score assigned by a reinforcement learning module.

According to one or more embodiments, the method comprises obtaining examples of requests to obtain a correction recommendation by querying a reinforcement learning module, said module being configured to select at least one example of request to obtain a correction recommendation from a data table relating to a type of anomaly, said table comprising examples of correction recommendation requests that have resulted in correction recommendations for an anomaly of said type, validated by the user and associated with a score, as a function of said score.

For example, the reinforcement learning module is configured to implement an optimization strategy, leading it to respond with the example(s) associated with the best scores.

According to one or more embodiments, the method comprises pre-reading a document, or governance plan, comprising relative information belonging to a group comprising:

information on the format of the runtime report, information on at least one attribute of the anomaly to be extracted from the runtime report, information on the similarity measurement and the acceptability threshold to be used to validate the recommendation for correcting the configuration file. In this way, the method is able to adapt to changes in anomaly detection tools, runtime report formats, and more generally to new implementation constraints.

According to one or more embodiments, submission of the correction recommendation comprises an update request, or pull request, to update the configuration file in a source code management repository, in accordance with the correction recommendation.

The recommendation for correction comprises a corrected version of the configuration file that generated the anomaly, ready to replace the previous, faulty version.

According to one or more embodiments, the method comprises obtaining an evaluation outcome of the correction recommendation by a user, and, depending on the evaluation outcome obtained, triggering or not triggering an update (E11) of the configuration file (SCP) in accordance with the correction recommendation.

In the event of validation, the print request is sent to the source code management repository, so that the source code can be corrected automatically. For example, the main branch of the source code, i.e. the one in operation, is replaced by a new branch containing the corrected configuration file.

According to one or more embodiments, the method comprises, in the event of a configuration file update being triggered, storing the recommendation request and the correction recommendation as an example in a data table relating to a type of anomaly, associated with a score.

For example, the associated score is determined as a function of a rating assigned by the user during validation. In another example, the associated score corresponds to the rating assigned by the user.

Correspondingly, according to at least one embodiment, a device is proposed for generating a recommendation for correcting a configuration file of an item of infrastructure of a computing environment within which services run, said infrastructure having been deployed automatically from said configuration file.

Said device comprises means for:

obtaining and storing in memory a runtime report comprising a compliance anomaly detected in the configuration file while said service is being run;

presenting an anomaly correction request as input to a previously trained generative artificial intelligence model (of the LLM type), said correction request comprising a question formulated in natural language and anomaly context information comprising at least the runtime report (LOG), and obtaining as output a configuration file correction recommendation (RECO);

validating the recommendation for correcting the configuration file, comprising the determining of a similarity measurement with respect to said context information and comparing with an acceptability threshold; and when the similarity measurement is above the acceptability threshold, submitting the configuration file correction recommendation for user evaluation.

According to one or more embodiments, the device comprises:

at least one processor; and at least one memory comprising computer program code, the at least one memory and the computer program code being configured to, together with the at least one processor, cause said device to be run.

According to one or more exemplary embodiments, the aforementioned device is configured to implement the method according to the first aspect, in its various embodiments.

Correspondingly, according to one or more exemplary embodiments, the aforementioned device is integrated into a platform for managing the deployment of a computing environment infrastructure using program code instructions comprising a device for generating a recommendation for correcting a configuration according to the second aspect According to one or more exemplary embodiments, the management platform comprises at least one memory comprising a data table or knowledge database, comprising entries, one said entry associating additional context information with at least one keyword.

According to one or more exemplary embodiments, said at least one memory further comprises at least one data table relating to a type of the anomaly, said table comprising examples of requests for obtaining a correction recommendation that resulted in obtaining recommendations for correcting an anomaly of said type, validated by the user, associated with a score, and the platform further comprises a reinforcement learning module configured to select at least one example of a request to obtain a correction recommendation from a data table relating to a type of the anomaly, as a function of said score, in response to a request for obtaining additional context information received from the device according to the second aspect.

At least one embodiment of the invention also relates to a computer program product comprising instructions for executing the aforementioned method.

Finally, at least one embodiment of the invention relates to a computer-readable recording medium on which the aforementioned computer program is recorded.

Of course, the one or more embodiments described above can be combined with one another.

BRIEF DESCRIPTION OF THE DRAWINGS

Other features and advantages of the one or more embodiments of the invention will become apparent upon reading the detailed description below, and the annexed drawings, wherein.

DETAILED DESCRIPTION OF THE INVENTION

Figure 1:
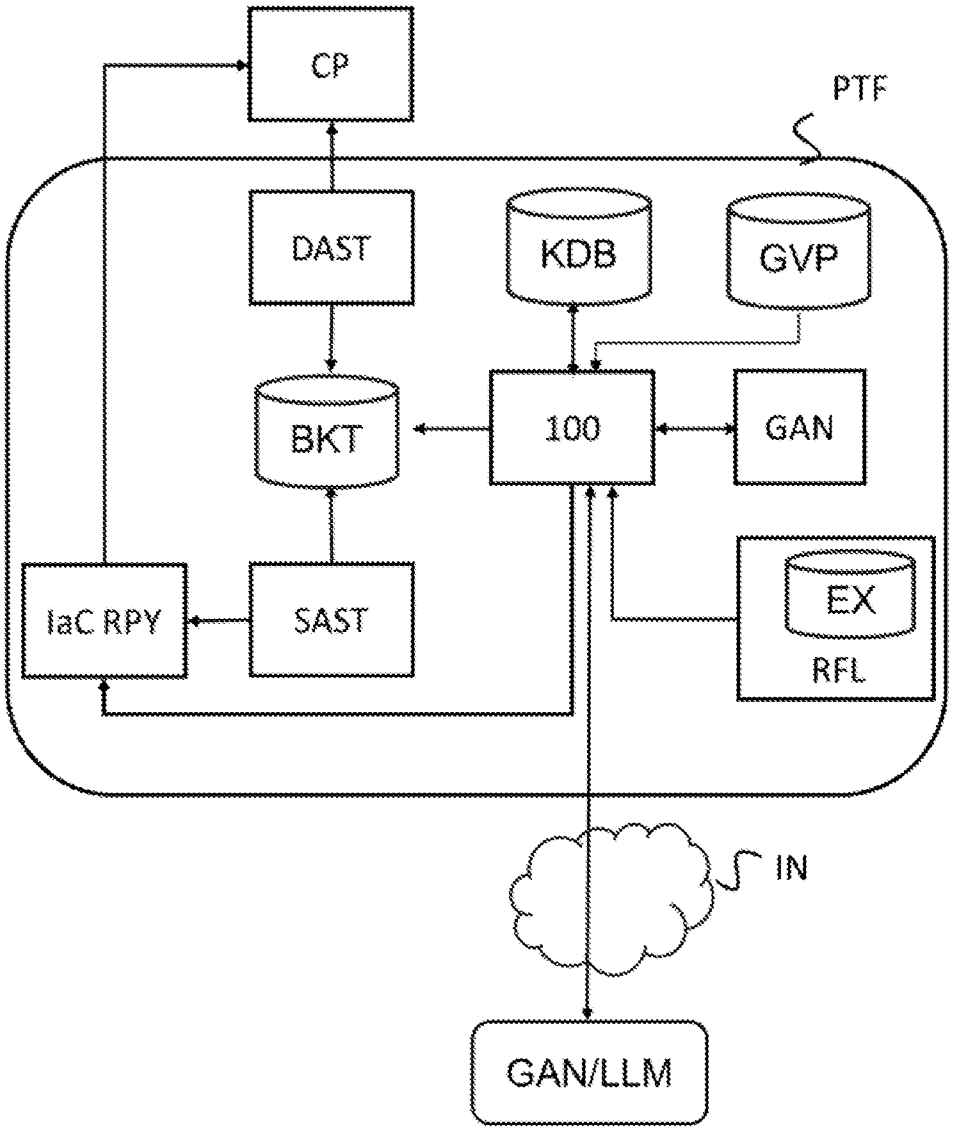
FIG. 1 schematically illustrates an example of the overall architecture of a platform for managing a computing environment comprising a device for generating a recommendation for correcting an anomaly detected in the configuration of that environment, according to one or more embodiments of the invention.

In relation to FIG. 1, we present an example of the overall architecture of a platform PTF for managing a computing environment infrastructure using a set of IaC software programs, according to one or more embodiments of the invention. For example, the computing environment in question is a distributed cloud computing environment. It is assumed that this environment is built from infrastructure elements and resources supplied by a cloud provider CP, whether public or private, with a view to implementing a computing project, such as a company's computing environment. The platform PTF comprises a plurality of components that interact with each other to manage this infrastructure and its evolution over time.

The first component is an IaC source code repository RPY. In computing, a repository is a centralized, organized storage facility for data, comprising one or more databases where source code files are located for distribution over the network, or a location directly accessible to users. In particular, the IaC repository RPY can be used to manage the archiving of different versions of a source code. In the case in point, this repository contains, in a main branch, the Infrastructure-as-Code source code files that had been used to provision the computing environment's infrastructure, as well as the services to be deployed. It is assumed here that deployment took place at the development, testing, and production stages in succession.

The platform PTF also hosts static analysis SAST and dynamic analysis DAST security tools configured to perform checks on the source code that enables the configuration and provisioning of the computing environment resources, and on the services deployed and in operation when the computing environment is active. Once the computing environment has been deployed in production, the security tools SAST and DAST run continuously to supervise the execution of services in that computing environment, and check that the services in operation comply with a corporate security policy, and consequently with the source code scripts configuring the underlying infrastructure. These security tools generate logs containing detected anomalies. The logs generated are stored in a memory, e.g. a non-relational bucket storage space BKT, e.g. S3, for Simple Storage Service, which is an online file storage service offered by Amazon AWS®. These logs will then be consumed by other components of the platform PTF, which will now be presented.

As shown in FIG. 1, in at least one embodiment, the platform PTF further comprises a data table, or knowledge database KDB, containing information relating to the various security analysis tools (static or dynamic) and, more generally, contextual information specific to the computing environment. The knowledge database KDB is stored in a memory on the platform PTF.

The platform PTF also includes a device (100) for generating a recommendation for correcting an anomaly in the configuration of an infrastructure of a computing environment within which services run, said infrastructure having been deployed automatically from the IaC configuration files stored in the reference warehouse. The device 100 comprises means for obtaining and storing in memory a runtime report comprising an anomaly detected during the runtime of a said service, presenting a request for correction of the anomaly as input to a GAN/LLM generative artificial intelligence module implementing a previously trained predictive model, said correction request comprising at least one question formulated in natural language and context information of the anomaly, and obtaining as output a recommendation for correcting the configuration file, validation of the recommendation for correcting the configuration file comprising determination of a similarity measurement with respect to said context information and comparison with an acceptability threshold; and when the similarity measurement is greater than the acceptability threshold, submitting the recommendation for correcting the configuration file for validation by a supervisor.

The GAN/LLM artificial intelligence module comprises, for example, one or more deep neural networks implementing a GAN generative artificial intelligence model, e.g. of the LLM (Large Language Model) type, such a module being trained on large quantities of unlabeled text using self-supervised learning or semi-supervised learning. An LLM model is often used to implement conversational agents. It is usually remote, accessible via the Internet for example. It has therefore not been trained at all in a context specific to the computing environment managed by the platform PTF.

The platform PTF therefore comprises communication means (not shown) via which it accesses the GAN/LLM module.

According to one or more embodiments, it further comprises a reinforcement learning RFL module configured to provide examples of correction requests/recommendations previously obtained by the device 100, and stored in one or more data tables TBQ in association with a score (or reward), for use as context information to be presented in the request to the GAN/LLM module.

Finally, the platform PTF comprises one or more storage spaces or memories wherein the IAC repository RPY, the knowledge database KDB and the data table(s) TBQ containing the sample correction requests/recommendations are stored. According to one or more embodiments, the platform PTF also stores in one of these memories, information specifying the operation and interactions between the various platform components just presented, for example within a document or file, called the governance plan GVP.

In the example shown in FIG. 1, the device 100 is integrated into the computing environment management platform PTF. Alternatively, it can be external to the platform PTF but connected to it via communication means.

Figure 2:
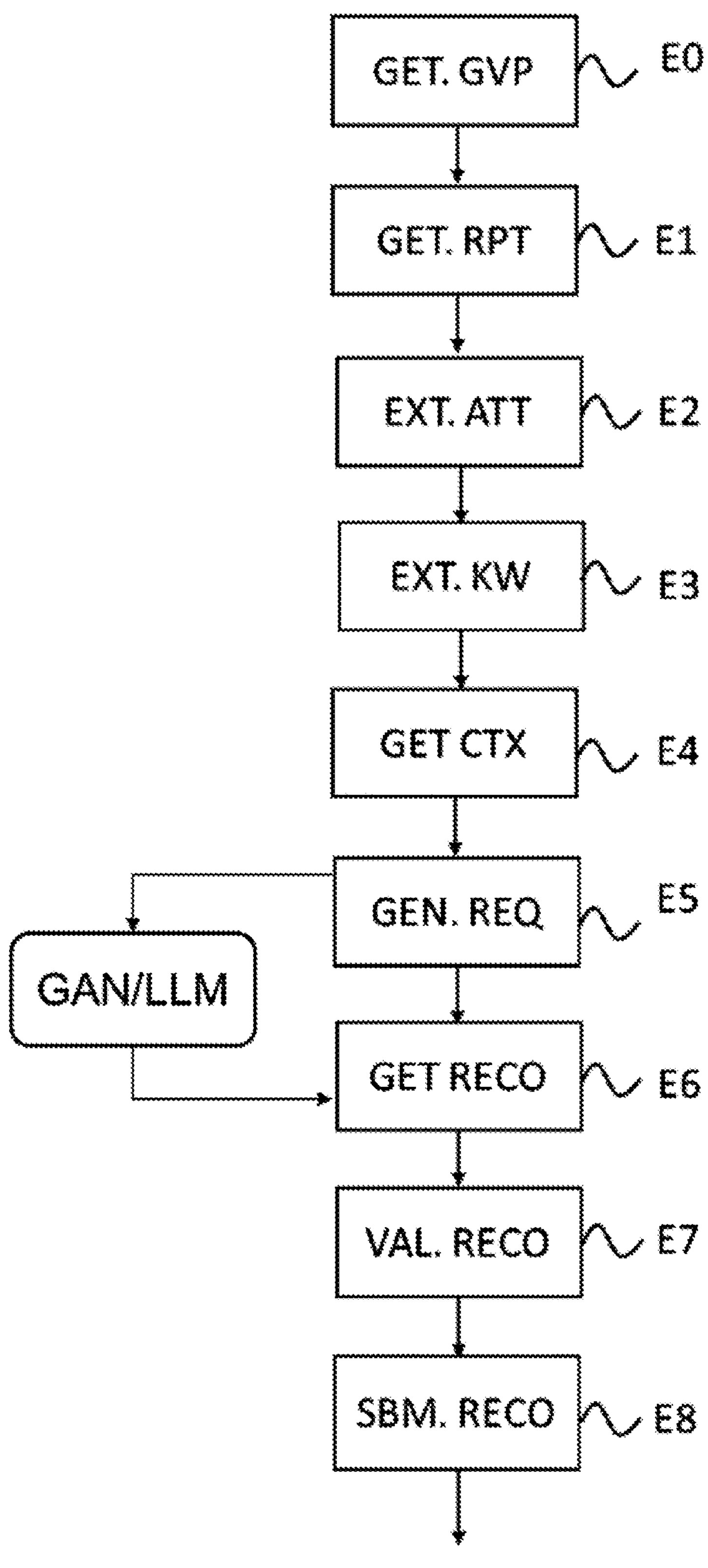
FIG. 2 illustrates in the form of a flowchart the steps in a method for generating a recommendation for correcting an anomaly detected in the configuration of a computing environment, according to one or more embodiments of the invention, FIG. 3 details the steps of the method for generating a recommendation for correcting an anomaly, according to one or more embodiments of the invention, FIG. 4 schematically illustrates an example of how the device for generating a correction recommendation interacts with a generative artificial intelligence module according to one or more embodiments of the invention, FIG. 5 schematically illustrates an example of the functional structure of a reinforcement learning module implemented by the environment management platform according to one or more embodiments of the invention, and FIG. 6 schematically illustrates an example of the hardware structure of a device for generating a recommendation for correcting an anomaly detected in the configuration of a computing environment, according to one or more embodiments of the invention.

According to one or more embodiments, the device 100 implements a method for generating a recommendation for correcting an anomaly, which will now be described in relation to FIG. 2. Here we consider a computing environment deployed by the execution of IaC configuration source code files, now in production, wherein at least one anomaly has been detected during the execution of a given service.

In E0, the governance plan GVP is obtained and read. It comprises information specifying the interfaces of the modules of the platform PTF with which the device 100 is configured to interact. According to one or more embodiments, the governance plan comprises group-related information comprising:

- information on the format of the error report,
- information on at least one attribute to be extracted from the runtime report,
- information on the number of attributes to be extracted from the runtime report,
- information on an algorithm for extracting keywords from said attributes,
- information on the number of keywords to be extracted from said attributes,
- a number of examples of requests/recommendations to be obtained,
- information on the similarity measurement and the acceptability threshold to be used to validate the recommendation for correcting the configuration file, and
- information relating to one or more roles that the GAN/LLM generative AI module can be asked to assume in a request to obtain a correction recommendation. These roles are associated, for example, with corporate documents that provide GAN/LLM with additional contextual information. For example, a document of the security policy type will be associated with a corporate security manager role, while a document of the naming convention type will be associated with an IT development manager role, and so on.

An example of a governance plan is provided in the appendix.

In the example shown in the appendix, it includes, in particular, information on the anomaly detection tools SAST and DAST. These include the tool name, the attributes or information fields to be extracted from the runtime report LOG files produced by each of these tools, and a format for these files. For example, the tool SAST used is the "KICS" tool, the runtime report file LOG it produces is of the JSON type (or format) and the attributes to be extracted from it include an anomaly type, "category", and an anomaly description, "description". One advantage of such a document is that it contains all the information to enable the device 100 to interact with the other modules of the platform PTF and, because the device 100 refers to it, it enables the device 100 to adapt to changes in tools and formats over time.

In a step E1, a runtime report LOG is obtained, for example by reading from a memory, such as the storage space BKT. It comprises at least one anomaly detected by the security tool SAST or DAST while the service was running. For example, a security anomaly, such as a failure to comply with the specifications of a given security policy applicable to the computing environment.

By way of non-limiting examples, such an anomaly may concern:

- failure to define, in a file of the dockerfile type, a user instruction for a user with limited rights, other than the root user, who has the extended rights required to deploy an infrastructure,
- failure to specify a maximum number of nodes in a virtual machine cluster, which poses the risk of deploying an unlimited number of machines,
- failure to specify logins for access to a remote server in a configuration file or script (such as a database, ftp server, etc.)

In E2, one or more attributes are extracted from the runtime report LOG in accordance with the specifications of the governance plan GVP. For example, the anomaly detection tool SAST generated a runtime report in JSON format and an anomaly category #i.

In E3, one or more keywords or metadata KW are extracted from the attributes of the runtime report LOG. According to one or more embodiments, the algorithm to be used to perform this extraction and the number of attributes to be extracted are specified by attributes of the governance plan GVP. In the example in the appendix, the number of keywords is set at 3 and the tool used is "BERT". This is a pre-trained deep learning artificial intelligence model developed by GoogleAI®, capable of solving a number of NLP (Natural Language Processing) problems.

In E4, context information specific to the detected anomaly is obtained. According to at least one embodiment, the context information comprises the runtime report LOG produced by the anomaly detection tool. According to a at least one embodiment, they comprise the configuration file SCP that generated the anomaly. According to at least one embodiment, the context information comprises one or more internal company documents, which are obtained, for example, by querying the knowledge database KDB from the previously extracted keywords/metadata KW. These documents can be security policies, naming conventions, or any other type of document constituting guidelines to be followed when implementing Infrastructure-as-Code within a company.

According to at least one embodiment, the knowledge database KDB is organized as a vector database, which associates one or more metadata with a document encoded in the form of a set of vectors. One advantage is the considerable compression of stored information. Another advantage is to meet a constraint on the maximum authorized size of a request to be submitted to the GAN/LLM module.

According to at least one embodiment, there are one or more previous examples of recommendations to correct an anomaly of the same type, for which the request to update the configuration file SCP in the IaC repository RPY has been accepted. For example, these examples are stored in a history, for example in a QDB #i data table specific to anomaly type #i (category attribute). In this table, they are associated with a score or reward, for example, and they are selected from this table by implementing a reinforcement learning algorithm as a function of this score or reward. One advantage of providing the GAN/LLM module with such examples as additional context elements is to control the type of response expected. Examples will be described in more detail below, in relation to FIG. 7, according to one or more embodiments of the invention.

In E5, a request REQ to correct the fault is generated from the attributes extracted from the runtime report LOG and the context information obtained. It comprises at least one question formulated in natural language, into which attributes and contextual information about the anomaly have been inserted.

It is then presented in E6 as an input to the remote GAN/LLM artificial intelligence module, via communication means, for example interfaces of the Application Program Interface (API) type, more particularly interfaces of the Representational State Transfer (REST) API type. A REST API enables applications to communicate with each other, using the http protocol, even if they use different operating systems and architectures.

Applying the request REQ to the input of the GAN artificial intelligence module results in the output E7 of a recommendation RECO for correcting the source code file or configuration script of the service SCP.

In E7, the recommendation RECO to correct the configuration file is validated or invalidated. In one or more embodiments, this validation involves checking that the source code of the corrected configuration file contained in the recommendation RECO is virtually identical to the original source code. In fact, since this is merely a matter of applying the modifications needed to bring the anomalous IaC configuration file into line with the requirements of a corporate security policy, the corrections made to the source code block should be minimal. To do this, a measure of similarity to the source code of the original file SCP is determined.

By way of one or more embodiments, one of the following similarity measurements, known per se, can be used:

The Jaccard index,

The Euclidean Distance,

Cosine Similarity.

For example, Jaccard's coefficient of similarity is a commonly used indicator of the similarity between two sets. If U is a set and A and B are subsets of U, the Jaccard index J(A,B) is defined as the ratio of the number of elements in their intersection to the number of elements in their union:

$$J(A, B) = \frac{|A \cap B|}{|A \cup B|}$$

This value is 0 when the two sets are disjoint, 1 when they are equal, and strictly between 0 and 1 in other cases. Two sets are more similar (i.e. they have relatively more members in common) when their Jaccard index is closer to 1.

The similarity measurement obtained is then compared with a given similarity threshold, and the recommendation is validated when the similarity measurement is greater than or equal to the threshold. For example, the threshold is set at 0.8 by the governance plan, as indicated in the appendix.

In this case, a request to update the configuration file on the basis of the recommendation to correct the configuration file is submitted in E8 for evaluation by a person, for example a security specialist or a computer code developer. For example, it is stored in a memory on the management platform PTF, and the person is notified that they need to evaluate a new update request. According to one or more embodiments, the update request comprises a request to pull, or replace, the configuration file in use with the corrected file in the IaC repository RPY.

It is understood that after this step, human intervention is required to approve or reject the correction recommendation made available by the method.

When, on the other hand, the recommendation RECO obtains a low similarity score below the threshold, this may indicate that the recommendation is irrelevant and does not take sufficient account of the context provided. It is therefore rejected. In this case, a person, such as a developer on the software development team or a supervisor, is notified of this non-similarity in E14. According to at least one embodiment, that person is asked to interact manually with the GAN/LLM module, rephrasing a more suitable request, which in E13 results in a new RECO' correction recommendation that passes the similarity test. This example will be described in more detail below, in relation to FIG. 4, according to one or more embodiments of the invention.

Figure 3:
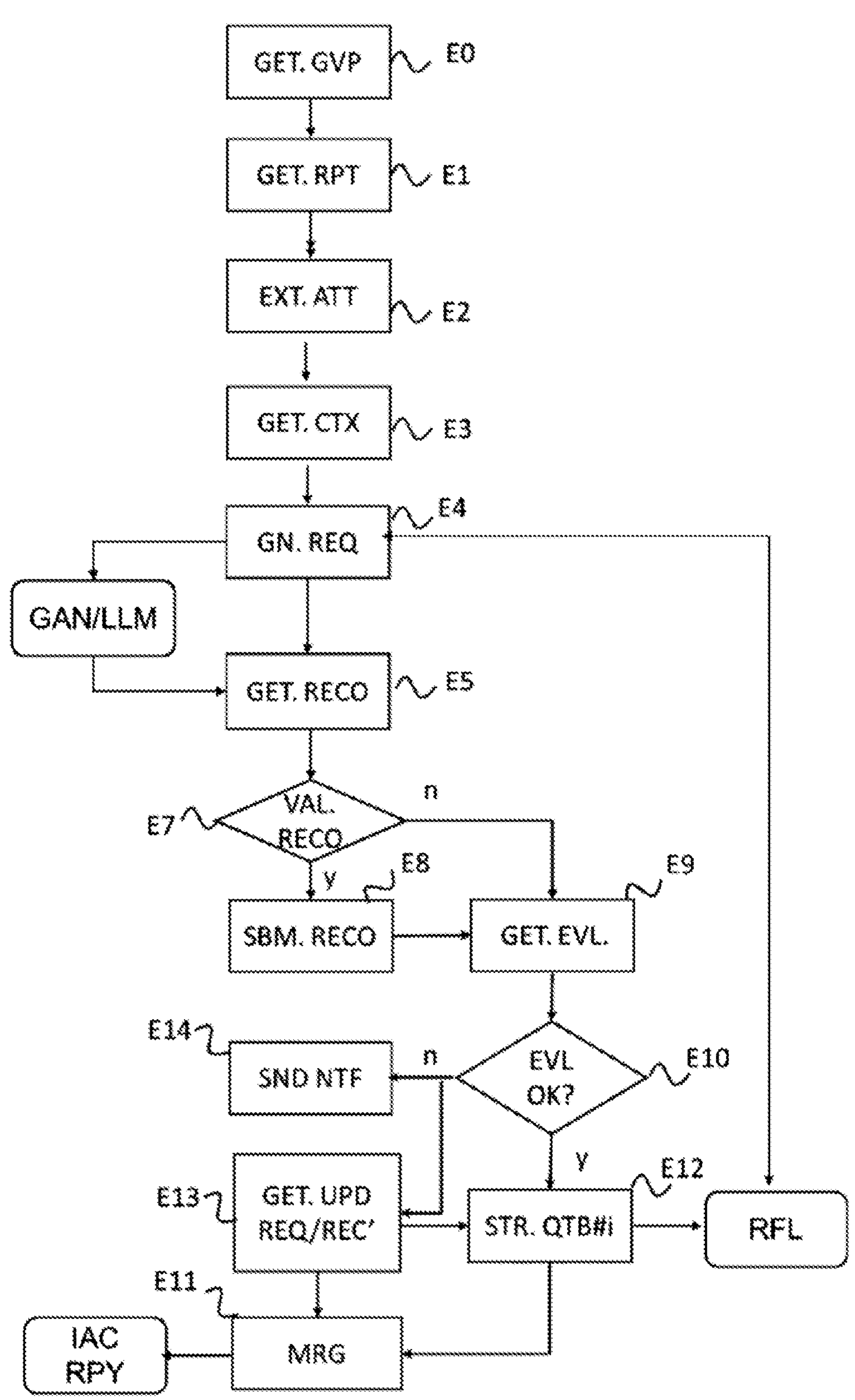

In relation to FIG. 3, we now describe the following steps E9 to E14 of the method for generating a correction recommendation request according to one or more embodiments of the invention.

An evaluation outcome is received in E9. Two cases are possible (E10):

In the first case (E10), the request to update the configuration file SCP in accordance with the recommendation RECO is accepted. This means that the recommendation RECO has been assessed as providing all the elements for full remediation of the anomaly.

The configuration file SCP is then updated at E11. In one example, the source code of the configuration file SCP stored in the IaC repository RPY is replaced by the file corrected in accordance with the recommendation RECO. In the case of a pull request, it is made from a secondary branch of the configuration source code of the computing environment infrastructure, containing the changes in the source code (i.e.

the configuration file SCP corrected in accordance with the RECO correction recommendation) and it is when the pull request is validated that the secondary branch is merged with the main branch to incorporate the changes made.

According to at least one embodiment, in E12, the request REQ and the recommendation RECO are stored as a new example in a data table QDB #i associated with the type of anomaly #i under consideration. A score is assigned to this new example and stored in memory, for example in the corresponding table QDB #i of the reinforcement learning module RFL shown in FIG. 1. According to one or more embodiments, this score corresponds to or is awarded on the basis of a rating assigned by the person who evaluated the recommendation RECO. For example, this rating has been awarded in accordance with a given rating grid, which defines the conditions for awarding each rating in the grid. For example, the highest rating (1) is awarded when the recommendation RECO enables full remediation of the anomaly, and when the request satisfies a given set of conditions. According to at least one embodiment, the score is high (0.8) but not maximum, because at least one element, for example an attribute specified in the governance plan GVP, is missing from the request REQ presented to the GAN/LLM module. For example, the role to be played by the GAN/LLM generative AI module in generating a RECO correction recommendation has either not been specified at all, or is incorrect. One cause may be that, when extracting keywords from the runtime report LOG, the device 100 did not find a role among those specified in the governance plan GVP that corresponded to the anomaly encountered.

In a second case (E10), the evaluator rejects the update request. One reason for this may be that the recommendation RECO does not allow for total remediation of the anomaly. According to one or more embodiments, the evaluator manually corrects the recommendation RECO. In at least one embodiment, that person manually interacts with the GAN/LLM module to generate a modified request REQ', leading to the production of an acceptable correction recommendation RECO' by the generative AI module. Once this new REQ'/RECO' pair has been obtained, the evaluator assigns it a score. In E13, the set formed by the request, the corrected recommendation and the evaluator's score is obtained by device 10. It is stored in E12 as a new example, for example in the table QDB #i, and the updating of the configuration file SCP in the IaC repository RPY is triggered in E11.

Figure 4:
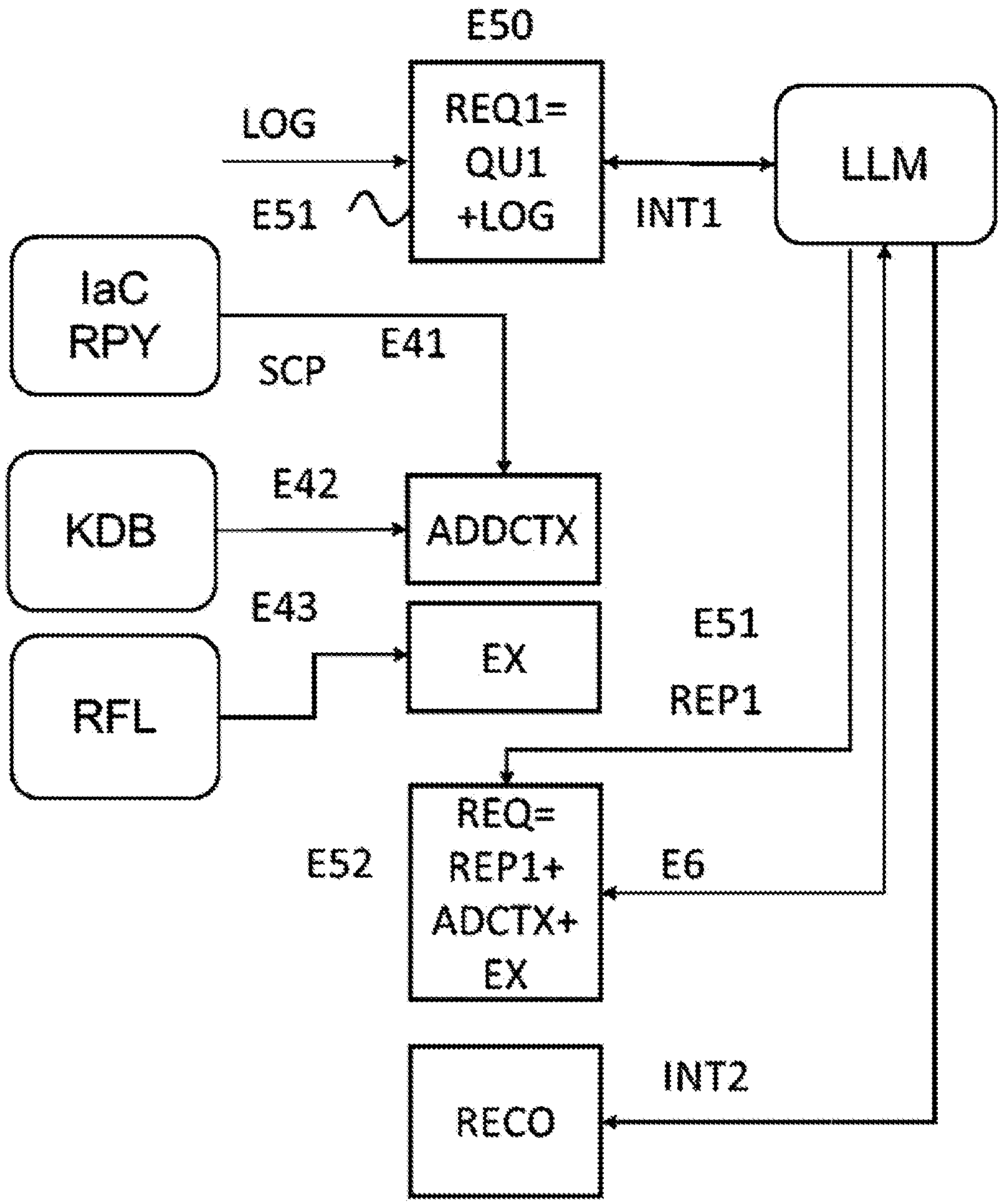

We now detail, in relation to FIG. 4, generating E5 the request for a correction recommendation and presenting E6 this request to the GAN/LLM module according to one or more embodiments of the invention. The point here is to take into account the fact that the GAN/LM module has been massively trained to answer questions formulated in natural language during a conversation, but has only limited knowledge of the previous message and cannot link the various parts of the conversation. This is because the LLM model has no persistent memory between individual interactions, and so cannot remember specific details or the wider context of the conversation unless this context is explicitly provided.

The strategy adopted is to construct questions (or "prompts") to be submitted to the GAN/LLM module in a standardized way so that these questions are clear and reproducible at a later date, and to associate them with specific contextual information to help the GAN/LLM module better understand the specific needs of the requester and provide coherent, informative answers.

According to at least one embodiment, the correction request REQ is generated in two stages. In a first step E51, a first request REQ1 is generated from a first pre-constructed question format, into which at least one attribute related to the anomaly, extracted from the runtime report, and context information comprising the runtime report LOG, are inserted.

The resulting request is presented to the GAN/LLM module during a first interaction INT1. The question is formulated in such a way as to obtain as output a REP1 response comprising a question formulated in natural language enabling the detected anomaly to be resolved.

In E52, the REP1 response obtained is used to generate the request REQ. To do this, we use a second pre-constructed question format into which we insert additional context information obtained in E4 and the question obtained in the response REP1. The transmission of specific contextual information relating to the occurrence of the anomaly to the generative AI module is essential, as it is this information that enables the LLM model to understand the question posed and thus generate coherent answers.

The additional context information comprises, for example, the configuration file SCP that generated the anomaly obtained from the IaC repository RPY in E41, an internal document such as the applicable security policy obtained from the knowledge database KDB in E42, and examples from the QDB #i data table associated with the anomaly type and selected by the reinforcement learning module RFL in E43.

The resulting request REQ is presented to the GAN/LLM module in E6 during a second interaction INT2. The recommendation RECO is obtained in response.

For example, the configuration file that generated the anomaly is a DOCKER file, and an attribute of the detected anomaly is the failure to include a standard user definition, with standard rights, for example read-only rights. A disadvantage of this anomaly is that only the user ROOT, who benefits from enhanced rights, particularly for writing, is defined, which poses a security problem and furthermore is not in line with the company's security policy.

For example, a root user on a virtual machine (VM) has a very high level of privilege, which means they can perform a wide variety of potentially risky actions. In particular, they can:

- install, update or remove any software on the VM. This means they can introduce malware or cause problems by deleting important system files.
- edit configuration files, startup files and other essential system elements. Incorrect edits may cause the system to malfunction or fail.
- monitor all processes running on the VM, including the ability to see the activities of other users. This can raise privacy issues.
- create, modify or delete user accounts on the VM. This can be used to grant or deny access to other users, but it also carries the risk of accidentally deleting accounts.
- edit permissions for accessing files and directories, potentially exposing sensitive data or making the system vulnerable to attack.
- configure firewall rules, security policies and other security settings. Configuration errors can leave the VM vulnerable to attack.
- access and control the VM's network interfaces, which means the user can manipulate network traffic, modify firewall rules and potentially compromise network security.
- restart or stop the VM, which can interrupt services that are running and cause data loss.

For example, the file type (DOCKER) and the anomaly attribute (the DOCKER file does not include a USER statement) are nested in the pre-constructed sentence as follows:

REQ 1: "Given the following sentence: The "DOCKER" file does not include a USER instruction", ask a question that will solve the problem'.

The answer REP1 obtained takes the form of the following question:

REP1: "Given the TYPE in the DOCKER FILE, how can I edit the DOCKER FILE to include a USER instruction and solve the problem of not having one?".

The request REQ comprises a question generated from the question REP1 returned by the GAN/LLM module, the configuration file SCP that generated the anomaly, and a second standard preconstructed question format and additional context elements, which takes the following form with the previous example:

REQ:

Based on the following DOCKER file:

[INPUT] block of source code extracted from DOCKER file

How can I modify the DOCKER FILE to include a USER INSTRUCTION and solve the problem of not having one?

[CONTROL]: Take the following "NB-EXAMPLES" into account

[CONTROL]: And take on the role of an "INFORMATION TECHNOLOGY DEVELOPER".

Additional context information is associated with it, including for example the definition of a standard user type.

One advantage of providing such additional contextual information is that it increases the chances of obtaining a correction recommendation in return, enabling full remediation of the anomaly in the source code. In the example above, the GAN/LLM module will use this information to generate a correction to the configuration file SCP wherein the standard user instruction has been added.

Figure 5:
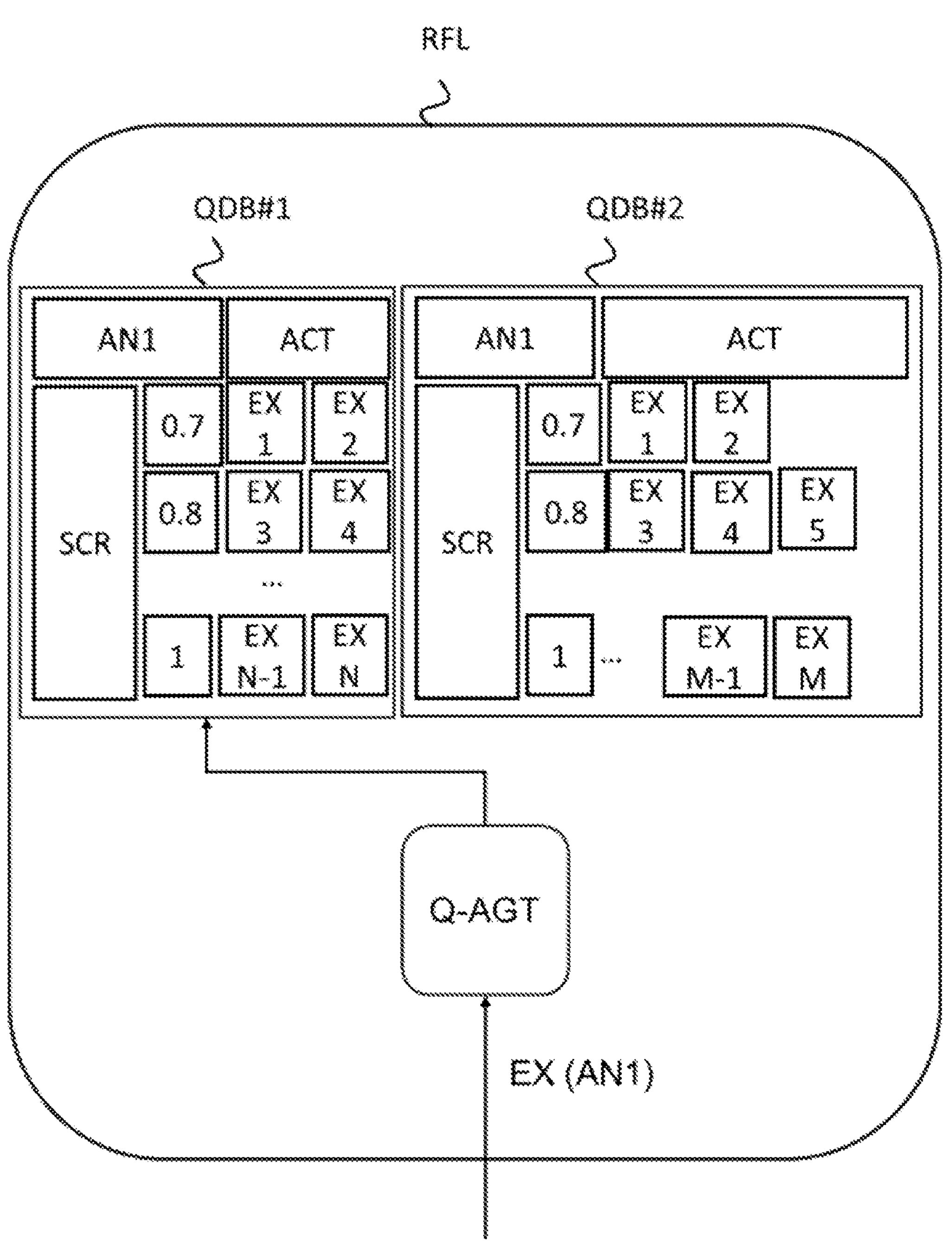

In connection with FIG. 5 an exemplary embodiment of a reinforcement learning module by the management platform PTF of FIG. 1.

Reinforcement learning is a type of machine learning wherein a software agent, i.e. a computer program that is configured to act autonomously and perform tasks in the manner of an automaton, learns to make decisions by interacting with an environment. Decisions are made to trigger actions that maximize reward.

According to at least one embodiment, the module RFL implements a "Q-Learning" type algorithm, known per se, for example described in the document published at the following URL: https://datascientest.com/q-learning-le-machine-learning-avec-apprentissage-par-renforcement, the principle of which is to explore different possible actions for a given state and choose the best action to take. The software agent Q-AGT is configured to make this choice according to a strategy, which can be either an optimal choice strategy or an exploration strategy. In this case, we assume that the strategy applied is that of optimal choice.

The agent Q-AGT is based on one or more data tables QDB of Q values (called Q functions). The Q values, stored in data table QDB #1, QDB #2, each represent an estimate of the value of an action in a particular state. More precisely, the table QDB #1, QDB #2 stores the Q values for each possible action-state in a given environment. Each cell in the table represents the Q value for a state-action pair, in this case an example of interaction with the GAN/LLM module (request REQ+correction recommendation RECO). This Q value for the state-action pair estimates an expected future reward following the agent's execution of the given action in the given state. The agent Q-AGT is configured to select the action with the highest Q value for each state. The table QDB #1, QDB #2 is updated at each stage of reinforcement learning to reflect new value estimates learned from the agent's interactions with the environment.

It should be noted, however, that when the number of state-action pairs becomes too large or the state/action space is continuous, the use of such a table QDB #1, QDB #2 may be inappropriate. Alternatively, a deep learning technique of the "Deep Q-Learning" type is envisaged, using a deep neural network, in particular a Deep Q-Network (DQN).

Within the framework of the method for generating a correction recommendation just described, which is intended to be implemented within the PTF management platform, the agent will not operate in just one environment, but rather in a plurality of micro-environments, each micro-environment being associated with a given anomaly type #i where i is an integer between 1 and N. Each micro-environment comprises a QDB #i table (in FIG. 6, only two tables are shown, for i=1, 2. In particular, this subdivision makes it possible to define smaller environments. As each of these micro-environments is a simple, discrete state space, the Q-Learning technique is ideally suited.

Environment

The microenvironment associated with a given type of anomaly stores examples of interactions EX1, 2, . . . , M, where M is an integer, obtained by the device 100. These examples were successively validated and then the request to update the configuration file SCP that had generated the anomaly in question was accepted by an evaluator who assigned a score to the example, in accordance with a given rating grid. For example, the rating is between 0 and 1. The examples contained in the QDB #i tables generally receive high marks, as they have passed validation and evaluation tests.

State/Action

In the context of reinforcement learning and Q-Learning, a state is a representation of the agent's current situation or context in the environment. It brings together all the relevant information that the agent needs to know in order to make a decision on the action to be taken. Within the platform PTF, a state is made up of all the examples that make up a micro-environment corresponding to a specific safety anomaly.

An action carried out by the Q-AGT agent within such a micro-environment corresponds to an example of interaction EX1, EX2 . . . EXM with the GAN/LLM module for the generation of recommendations for the correction of anomalies of this type, stored in the TBQ data table.

Action Value/Reward

An action value or reward here corresponds to an ability of the corresponding interaction example to generate an optimal recommendation, i.e. one that will be validated (E7) and obtain the approval of a supervisor E9 in response to a pull request.

Two-Step Agent Involvement

The Q-AGT agent's involvement in the platform PTF is twofold:

At a first level, it provides one or more examples that constitute part of the additional context information to be added when interacting with the GAN/LLM module. More precisely, it involves selecting a given number of examples, for example in accordance with a parameter ("n_examples") specified in the governance plan GVP. The agent is implemented to select from the data table QDB #i associated with the micro-environment corresponding to the type of anomaly #i detected by the runtime report LOG, the action(s) (examples) that enable it to maximize its reward according to a given policy. For example, according to an optimal choice policy, it chooses the n-examples of interaction having obtained the best reward in the table QDB #i.

At a second level, it is configured to store in memory a new REQ/RECO example whose update request has been accepted by the evaluator. It is configured to take into account the score assigned by the evaluator to determine the reward they associate with this new example in the data table QDB #i associated with the micro-environment concerned. According to one or more embodiments, the reward value corresponds to the rating awarded by the evaluator. In at least one embodiment, the agent Q-AGT can be configured to downgrade the rewards associated with older examples relative to the newly added example by applying a novelty bonus criterion. One advantage is that this new example can be chosen when the device 100 next requests additional context information, and can therefore be adapted to changes in anomaly detection tools, security policy or, more generally, the modules that interact with the device 100.

The functions, steps and methods described herein can be implemented by software (for example, via software on one or more processors, for execution on a general-purpose or special-purpose computer) and/or implemented by hardware (for example one or more electronic circuits, and/or any other hardware component).

The present description thus relates to a computer software or program, capable of being executed by a host device (for example, the device 100) by means of one or more data processors, this program/software comprising instructions for causing the execution by this host device of all or some of the steps of one or more of the methods described herein. These instructions are intended to be stored in a memory of the host device, loaded and then executed by one or more processors of this host device so as to cause this host device to execute the method.

This software/program may be coded by means of any programming language, and be in the form of source code, object code, or intermediate code between source code and object code, such as in a partially compiled form, or in any other desirable form.

The host device can be implemented by one or more physically separate machines. The host device can have the overall architecture of a computer, including the constituents of such an architecture: data memory(s), processor(s), communication bus, hardware interface(s) for connecting this host device to a network or other equipment, user interface(s), etc.

In at least one embodiment, some or all of the steps of the programming method or other method described herein are implemented by a programming device provided with means for implementing those steps of this method.

These means may comprise software means (for example, instructions for one or more components of a program) and/or hardware means (for example, data memory(ies), processor(s), communication bus, hardware interface(s), etc.).

These means may comprise for example one or more circuits configured to execute one or more or all of the steps of one of the methods described herein. These means may comprise for example at least one processor and at least one memory comprising program instructions configured to, when executed by the processor, cause the device to perform one or more or all of the steps of one of the methods described herein.

Figure 6:
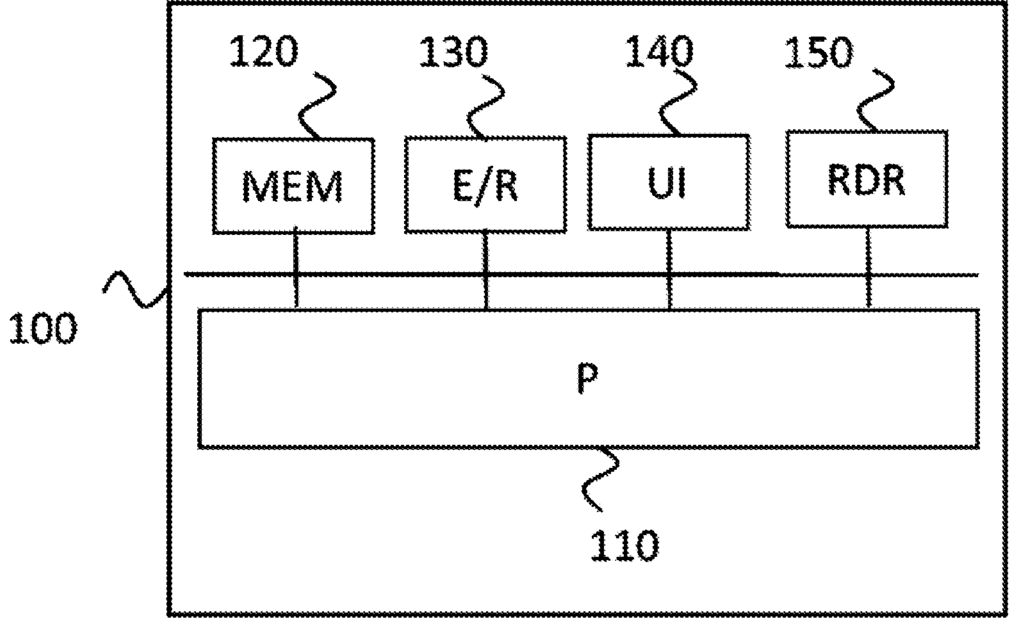

FIG. 6 illustrates an example hardware structure of a device 100 for generating a recommendation for correcting a configuration file according to one or more embodiments of the invention. In this example, the device 100 is configured to implement all the steps of the aforementioned method as described herein. Alternatively, it could also implement only some of these steps.

In relation to FIG. 6, the device 100 comprises at least one processor 110 and at least one memory 120. The device 100 may also comprise one or more communication interfaces. In this example, the device 100 comprises network interfaces 130 (for example, network interfaces for wired/wireless network access, including an Ethernet interface, a WIFI interface, etc.) connected to the processor 110 and configured to communicate via one or more wired/wireless communication links and user interfaces 140 (for example, a keyboard, a mouse, a display screen, etc.) connected to the processor. The device 100 may also comprise one or more RDR media players 150 for reading a computer-readable storage medium (for example, a digital storage disk (CD-ROM, DVD, Blue Ray, etc.), a USB stick, etc.). The processor 110 is connected to each of the other aforementioned components in order to control the operation thereof.

The memory 120 may comprise a random-access memory (RAM), cache memory, non-volatile memory, backup memory (for example, programmable or flash memories), read-only memory (ROM), a hard disk drive (HDD), a solid-state drive (SSD) or any combination thereof. The ROM of the memory 120 can be configured to store, inter alia, an operating system of the device 100 and/or one or more computer program codes of one or more software applications. The RAM of the memory 120 can be used by the processor 110 for temporary data storage.

The processor 110 can be configured to store, read, load, execute and/or else process instructions stored in a computer-readable information storage medium and/or in the memory 120 so that, when the instructions are executed by the processor, the device 100 performs one or more or all of the steps of the method described herein. Means implementing a function or set of functions may correspond in this document to a software component, a hardware component or even a combination of hardware and/or software components, capable of implementing the function or set of functions, as described below for the means related.

One or more embodiments of the invention also relates to an information storage medium readable by a data processor, comprising instructions of a program as mentioned above.

The information storage medium can be any hardware means, entity or apparatus, capable of storing the instructions of a program as mentioned above. Usable program storage media include ROM or RAM, magnetic storage media such as magnetic disks and tapes, hard disks or optically readable digital data storage media, or any combination thereof.

In some cases, the computer-readable storage medium is non-transitory. In other cases, the information storage medium may be a transient medium (for example, a carrier wave) for transmitting a signal (electromagnetic, electrical, radio or optical signal) containing program instructions. This signal can be routed via a suitable wired or wireless transmission means: electrical or optical cable, radio or infrared link, or by other means.

At least one embodiment also relates to a computer program product comprising a computer-readable storage medium on which program instructions are stored, the program instructions being configured to cause the host device (e.g. a computer) to implement some or all of the steps of one or more of the processes described herein when the program instructions are executed by one or more processors and/or one or more programmable hardware components of the host device.

According to one or more embodiments, the device 100 is itself integrated into a host device, for example the platform PTF for managing a computing environment infrastructure as described herein. This platform can also be implemented by one or more physically separate machines, and has the overall architecture of a computer and the hardware structure of a computer as previously described for the device 100 in relation to FIG. 7.

The above-mentioned embodiments and their variants each have numerous advantages. They harness the power of generative artificial intelligence in a method and device for automatically generating patches for infrastructure and service configuration files in a computing environment deployed in an Infrastructure-as-Code (IaC) mode.

Thanks to the combined use of generative AI, data tables enabling the provision of additional relevant context, and a reinforcement learning technique within a computing environment management platform, this method and device makes it possible to adapt to a changing context, for example of anomaly detection tools or of the policy of the company for which the computing environment has been deployed.

APPENDIX type: Governance_Plan
spec:
SAST:
tool: KICS
attribute: [“Real_value”]
log_type: json
DAST:
tool: Appscan
attributes: [“Description”]
log_type: json
roles:[“security_specialist”, “head_developer”, “architect”]
SIMILARITY:
Similarity_measurement: “index_jaccard”
threshold: 0.80
extraction_motscles:
algorithm: “BERT”
n_keywords: 3
reinforcement_learning:
n_examples: 3

What is claimed is:

1. A method for generating a recommendation for correcting a configuration file of an item of infrastructure of a computing environment within which services run, said infrastructure having been deployed automatically from said configuration file, said method comprising:

obtaining and storing in memory a runtime report comprising a compliance anomaly detected in the configuration file during execution of a service in the computing environment;

presenting an anomaly correction request as input to a previously trained generative artificial intelligence model of a Large Language Model type, said anomaly correction request comprising a question formulated in natural language and anomaly context information comprising at least the runtime report, and obtaining as output a configuration file correction recommendation that includes a recommendation for correcting the configuration file;

validating the recommendation for correcting the configuration file, comprising determining a similarity measurement between a corrected version of source code of the configuration file contained in the recommendation and an original version of source code of the configuration file and comparing said similarity measurement with an acceptability threshold;

when the similarity measurement is above the acceptability threshold, submitting the configuration file correction recommendation for user evaluation by a user.

2. The method according to claim 1, further comprising extracting attributes from the runtime report, said attributes comprising at least one anomaly type and a configuration file type, generating a request to obtain said question from a pre-constructed standard question and said attributes, presenting said request as input to said previously trained generative artificial intelligence model during a first interaction with the previously trained generative artificial intelligence model, and obtaining said question as output from the previously trained generative artificial intelligence model.

3. The method according to claim 2, further comprising extracting keywords from said attributes of the runtime report and obtaining additional context information by querying at least one data table comprising entries associating context information of the computing environment with at least one keyword of said keywords.

4. The method according to claim 3, wherein the additional context information belongs to a group comprising at least:

the configuration file that generated the compliance anomaly, information on a security policy applicable to the computing environment, one or more examples of previously obtained correction requests/recommendations.

5. The method according to claim 2, further comprising obtaining examples of requests to obtain a correction recommendation by querying a reinforcement learning module, said reinforcement learning module being configured to select at least one example of request from said examples of requests to obtain a correction recommendation from a data table relating to a type of anomaly, said data table comprising examples of correction recommendation requests that have resulted in correction recommendations for an anomaly of said type, validated by the user and associated with a score, as a function of said score.

6. The method according to claim 1, further comprising prior reading of a document or governance plan, comprising relative information belonging to a group comprising:

information on a format of the runtime report, information on at least one attribute of the compliance anomaly to be extracted from the runtime report, information on the similarity measurement and the acceptability threshold to be used to validate the recommendation for correcting the configuration file.

7. The method according to claim 1, wherein said submitting the configuration file correction recommendation comprises an update request, or pull request, to update the configuration file in a source code management repository, in accordance with the configuration file correction recommendation.

8. The method according to claim 1, further comprising obtaining an evaluation outcome of the configuration file correction recommendation by said user, and, depending on the evaluation outcome that is obtained, triggering or not triggering an update of the configuration file in accordance with the configuration file correction recommendation.

9. The method according to claim 8, further comprising, when said triggering of the update of the configuration file occurs, recording a request to obtain a recommendation and the configuration file correction recommendation as an example in a data table relating to a type of anomaly, in association with a score.

10. A device that generates a recommendation to correct a configuration file of an item of infrastructure of a computing environment within which services run, said infrastructure having been deployed automatically from said configuration file, said device comprising:

one or more circuits configured to execute a method comprising obtaining and storing in memory a runtime report comprising a compliance anomaly detected in the configuration file during execution of a service in the computing environment;

presenting an anomaly correction request as input to a previously trained generative artificial intelligence model of a Large Language Model type, said anomaly correction request comprising a question formulated in natural language and anomaly context information comprising at least the runtime report, and obtaining as output a configuration file correction recommendation comprising a recommendation for correcting the configuration file;

validating the recommendation for correcting the configuration file, comprising determining a similarity measurement between a corrected version of source code of the configuration file contained in the recommendation and an original version of source code of the configuration file and comparing said similarity measurement with an acceptability threshold;

when the similarity measurement is above the acceptability threshold, submitting the configuration file correction recommendation for user evaluation by a user.

11. The device according to claim 10, wherein said one or more circuits comprise at least one processor; and at least one memory comprising computer program code, the at least one memory and the computer program code being configured to, together with the at least one processor, cause said device to be run.

12. The device according to claim 10, wherein said device further comprises a non-transitory computer program comprising program code instructions which, when said program code instructions executed by computer, cause the one or more circuits to execute the method.

13. A platform that manages a deployment of a computing environment infrastructure using program code instructions, comprising:

a device that generates a configuration correction recommendation to correct a configuration file of an item of infrastructure of a computing environment within which services run, said infrastructure having been deployed automatically from said configuration file, said device comprising:

one or more circuits configured to execute a method comprising obtaining and storing in memory a runtime report comprising a compliance anomaly detected in the configuration file during execution of a service in the computing environment;

presenting an anomaly correction request as input to a previously trained generative artificial intelligence model of a Large Language Model type, said anomaly correction request comprising a question formulated in natural language and anomaly context information comprising at least the runtime report, and obtaining as output a configuration file correction recommendation comprising a recommendation for correcting the configuration file;

validating the recommendation for correcting the configuration file, comprising determining a similarity measurement between a corrected version of source code of the configuration file contained in the recommendation and an original version of source code of the configuration file and comparing said similarity measurement with an acceptability threshold;

when the similarity measurement is above the acceptability threshold, submitting the configuration file correction recommendation for user evaluation by a user.

14. The platform according to claim 13, further comprising at least one memory comprising a data table or knowledge database, comprising entries, one entry of said entries associating additional context information with at least one keyword.

15. The platform according to claim 14, wherein said at least one memory further comprises at least one data table relating to a type of the compliance anomaly, said at least one data table comprising examples of requests to obtain a correction recommendation that resulted in obtaining recommendations (to correct the compliance anomaly of said type, validated by the user, associated with a score, and the platform further comprises a reinforcement learning module configured to select at least one example of a request from said examples of requests to obtain a correction recommendation from a data table relating to said type of the compliance anomaly, as a function of said score, in response to a request to obtain additional context information received from said device.

* * * * *